United States Patent
Ito

(10) Patent No.: US 12,208,839 B2
(45) Date of Patent: Jan. 28, 2025

(54) FLOOR DRAIN FOR UTILITY VEHICLE AND UTILITY VEHICLE

(71) Applicant: Kawasaki Motors, Ltd., Hyogo (JP)

(72) Inventor: Takuya Ito, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 77 days.

(21) Appl. No.: 17/965,809

(22) Filed: Oct. 14, 2022

(65) Prior Publication Data
US 2024/0124072 A1 Apr. 18, 2024

(51) Int. Cl.
B62D 25/24 (2006.01)
B62D 25/20 (2006.01)

(52) U.S. Cl.
CPC ............ B62D 25/24 (2013.01); B62D 25/20 (2013.01)

(58) Field of Classification Search
CPC .......... B62D 25/24; B62D 25/20; B60R 13/07
See application file for complete search history.

(56) References Cited

U.S. PATENT DOCUMENTS

| | | | | |
|---|---|---|---|---|
| 5,709,309 A * | 1/1998 | Gallagher | ............... | B62D 25/24 137/849 |
| 6,361,099 B1 * | 3/2002 | McIntosh | ............... | B60N 3/04 470/906 |
| 8,555,567 B2 * | 10/2013 | Andras | ............... | E02D 3/106 52/169.5 |
| 10,059,242 B1 * | 8/2018 | Willobee | ............... | B60N 3/048 |
| 10,246,153 B2 * | 4/2019 | Deckard | ............... | B60N 2/58 |
| 11,078,658 B2 * | 8/2021 | Say | ............... | E03F 5/041 |
| 11,325,656 B2 * | 5/2022 | Glickman | ............... | B60R 7/02 |
| 11,578,800 B2 * | 2/2023 | Ventallo | ............... | B60J 10/24 |
| 2019/0329828 A1 | 10/2019 | Marchlewski et al. | | |
| 2021/0155192 A1 * | 5/2021 | Gordon | ............... | B60R 21/13 |
| 2023/0150588 A1 * | 5/2023 | Deckard | ............... | B60K 13/00 280/775 |

FOREIGN PATENT DOCUMENTS

FR 2845061 A1 * 4/2004 ............ B62D 25/24

OTHER PUBLICATIONS

Machine Translation of FR2845061. (Year: 2024).*

* cited by examiner

*Primary Examiner* — Jason S Morrow
(74) *Attorney, Agent, or Firm* — XSENSUS LLP

(57) ABSTRACT

At a floor drain, a groove extending in an up-down direction is located at a peripheral edge of a drain opening, and a cap has a circular columnar body extending in the up-down direction, a flange disposed at an outer peripheral surface of the body and mounted on the peripheral edge, and a claw disposed lower than the flange at the outer peripheral surface of the body and having an upper surface inclined upward toward one side in a circumferential direction of the body. The upper surface of the claw and a lower surface of the peripheral edge contact each other to close the drain opening in such a manner that the body is rotated to the other side in the circumferential direction with the claw inserted downward into the groove.

11 Claims, 10 Drawing Sheets

FLOOR DRAIN FOR UTILITY VEHICLE AND UTILITY VEHICLE

FIELD

The technique disclosed herein relates to a floor drain for a utility vehicle and a utility vehicle.

BACKGROUND

For example, a specification of U.S. Patent Application Publication No. 2019/0329828 discloses a floor drain disposed at a floor of a vehicle. In the floor drain, a plug is screwed into a drain member having a drain opening, and the drain opening is closed accordingly.

SUMMARY

There is still room for improvement in the above-described floor drain in terms of simplification of an operation of opening or closing the drain opening.

The technique disclosed herein has been made in view of such a point, and an object thereof is to easily open or close the drain opening.

The technique disclosed herein is a floor drain for a utility vehicle, the floor drain including a drain opening located at a floor of the utility vehicle and a cap that opens or closes the drain opening. A groove extending in an up-down direction is located at a peripheral edge of the drain opening. The cap has a circular columnar body extending in the up-down direction, a flange disposed at an outer peripheral surface of the body and mounted on the peripheral edge, and a claw disposed at a position lower than the flange at the outer peripheral surface of the body and having an upper surface inclined upward toward one side in a circumferential direction of the body. The upper surface of the claw and a lower surface of the peripheral edge contact each other to close the drain opening in such a manner that the body is rotated to the other side in the circumferential direction of the body with the claw inserted downward into the groove.

Another technique disclosed herein is a floor drain for a utility vehicle, the floor drain including a drain opening located at a floor of the utility vehicle and a cap that opens or closes the drain opening. A groove extending in an up-down direction is located at a peripheral edge of the drain opening. The cap has a circular columnar body extending in the up-down direction, a flange disposed at an outer peripheral surface of the body and mounted on the peripheral edge, and a claw disposed at a position lower than the flange at the outer peripheral surface of the body, and the drain opening is closed in such a manner that an upper surface of the claw contacts a lower surface of the peripheral edge by rotation of the body in a predetermined rotation direction with the claw inserted downward into the groove. A protrusion is disposed at one of the peripheral edge or the claw, and a lock that locks the protrusion after the body has been rotated in the predetermined rotation direction is located at the other one of the peripheral edge or the claw.

Still another technique disclosed herein is a utility vehicle including a vehicle body having a floor and the above-described floor drain disposed at the floor.

DESCRIPTION OF EMBODIMENTS

Hereinafter, an exemplary embodiment will be described in detail based on the drawings.

Figure 1:
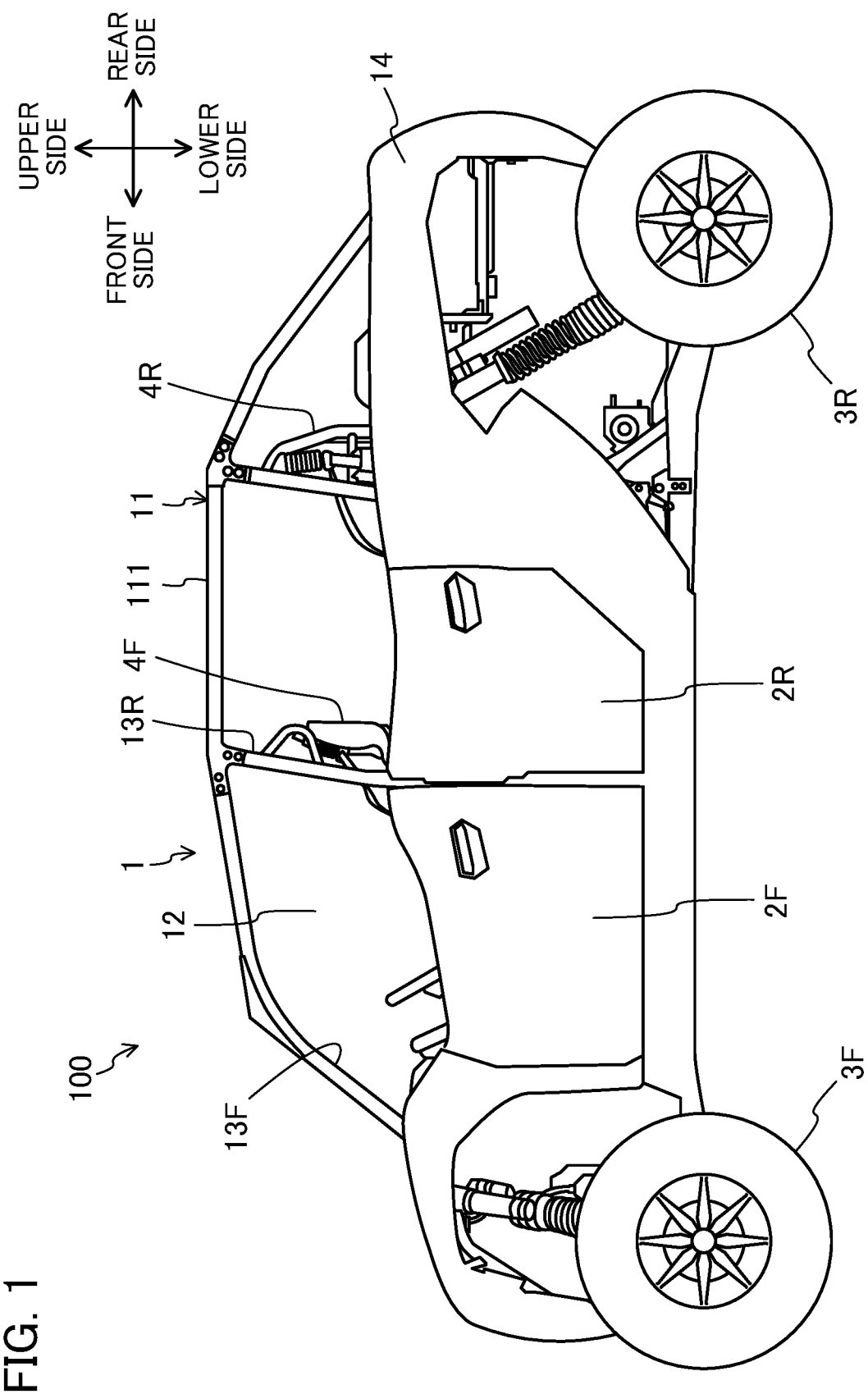
FIG. 1 is a left side view showing an outline configuration of a utility vehicle.

FIG. 1 is a left side view showing an outline configuration of a utility vehicle 100. The utility vehicle 100 is an automobile that can travel off road. The utility vehicle 100 includes a vehicle body 1, front doors 2F and rear doors 2R, front wheels 3F and rear wheels 3R, and front seats 4F and rear seats 4R.

Hereinafter, a front-rear direction will be set such that front and rear sides of the utility vehicle 100 in a traveling direction thereof is "front" and "rear," a right-left direction will be set such that right and left sides when facing the front side of the utility vehicle 100 in the traveling direction thereof are "right" and "left," and a height direction of the utility vehicle 100 will be set as an up-down direction. Moreover, the right-left direction is the same as a vehicle width direction that is a width direction of the utility vehicle 100, and for the sake of convenience in description, a vehicle compartment side in the vehicle width direction will be sometimes referred to as an "inner side in the vehicle width direction" and a vehicle outer side in the vehicle width direction will be sometimes referred to as an "outer side in the vehicle width direction."

The vehicle body 1 has a vehicle body frame 11, side covers 14, etc. The side cover 14 covers at least part of a side surface of the vehicle body frame 11. A cabin 12 that is a space where an occupant is present is defined in the vehicle body 1. A front entrance 13F and a rear entrance 13R causing the cabin 12 and the outside of the vehicle to communicate with each other are located at a side portion of the vehicle body frame 11, i.e., a side portion of the vehicle body 1. In this example, the front entrances 13F and the rear entrances 13R are, although not shown in the figure, located at both right and left side portions of the vehicle body 1.

The vehicle body frame 11 has a rollover protection structure 111 commonly known as ROPS. The rollover protection structure 111 protects the occupant when the utility vehicle 100 overturns. The rollover protection structure 111 defines upper portions of the front entrances 13F and the rear entrances 13R.

The front door 2F opens or closes the front entrance 13F, specifically part of the front entrance 13F. The rear door 2R opens or closes the rear entrance 13R, specifically part of the rear entrance 13R. That is, the front door 2F and the rear door 2R in this example are of a so-called half door type, and do not have windows. The front wheels 3F are each disposed on the right and left sides and the rear wheels 3R are each disposed on the right and left sides, and these front and rear wheels 3F, 3R support the vehicle body 1.

The front seats 4F and the rear seats 4R are disposed in the cabin 12. The front seat 4F and the rear seat 4R are aligned in the front-rear direction in the cabin 12. That is, the rear seat 4R is arranged at the rear of the front seat 4F. In this example, the front seats 4F are each disposed on the right and left sides and the rear seats 4R are each disposed on the right and left sides, although not shown in the figure.

Figure 2:
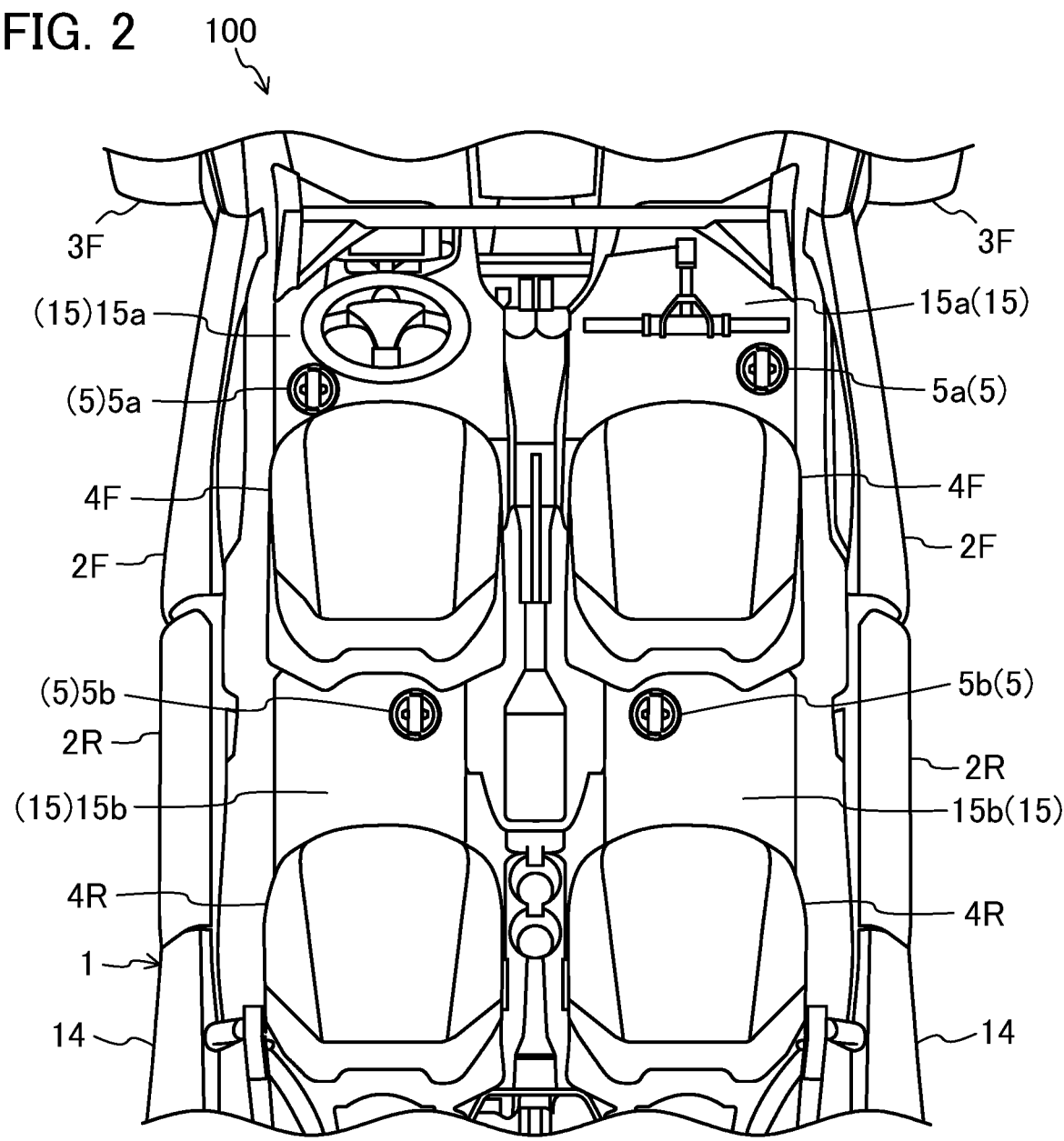
FIG. 2 is a plan view showing the inside of a cabin from above.
Figure 2:
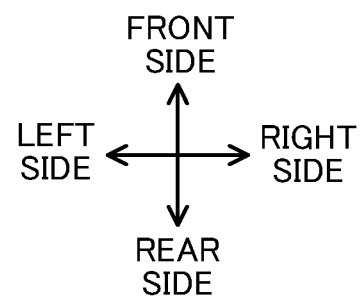
Figure 3:
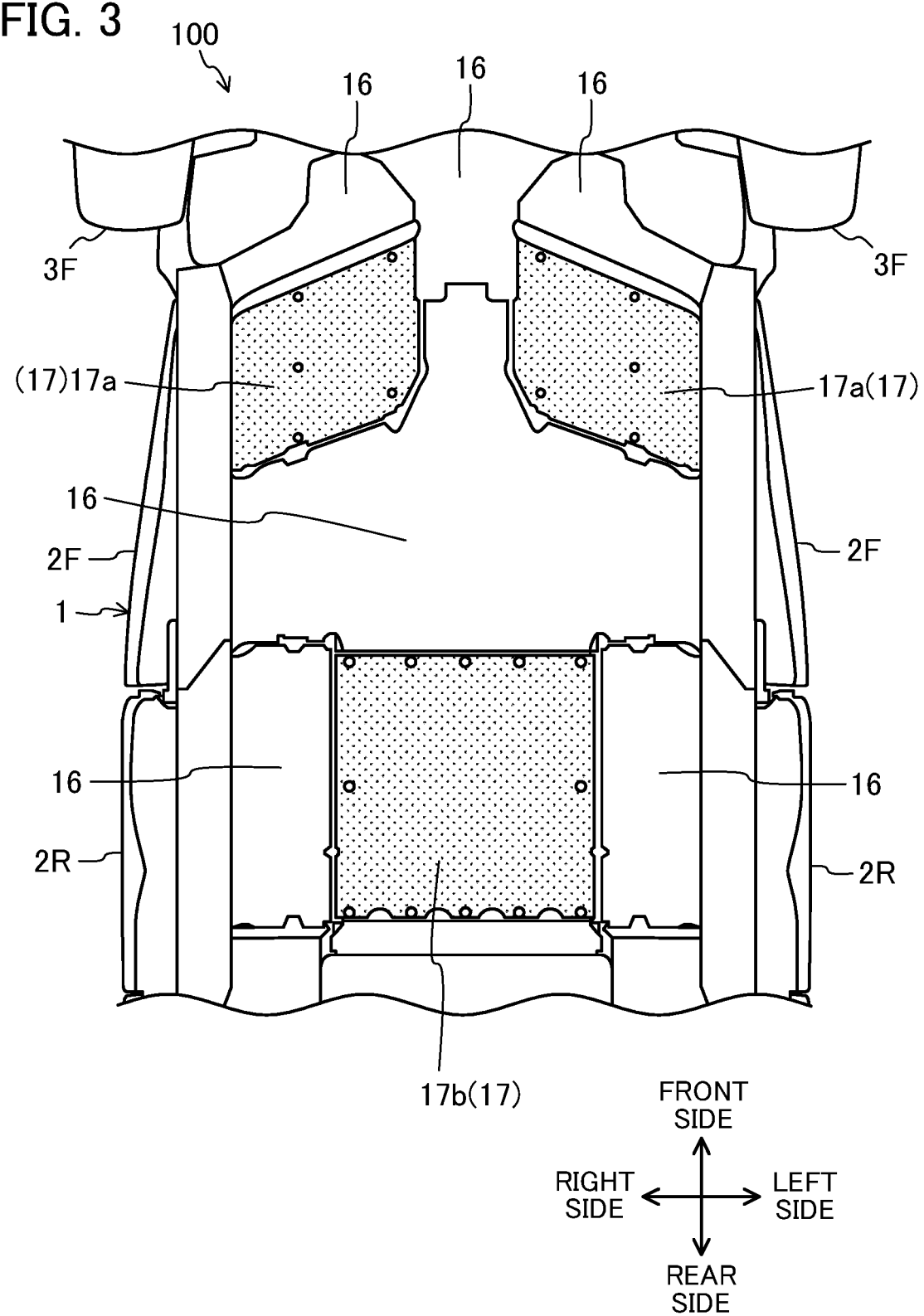
FIG. 3 is a bottom view showing a vehicle body from below.
Figure 4:
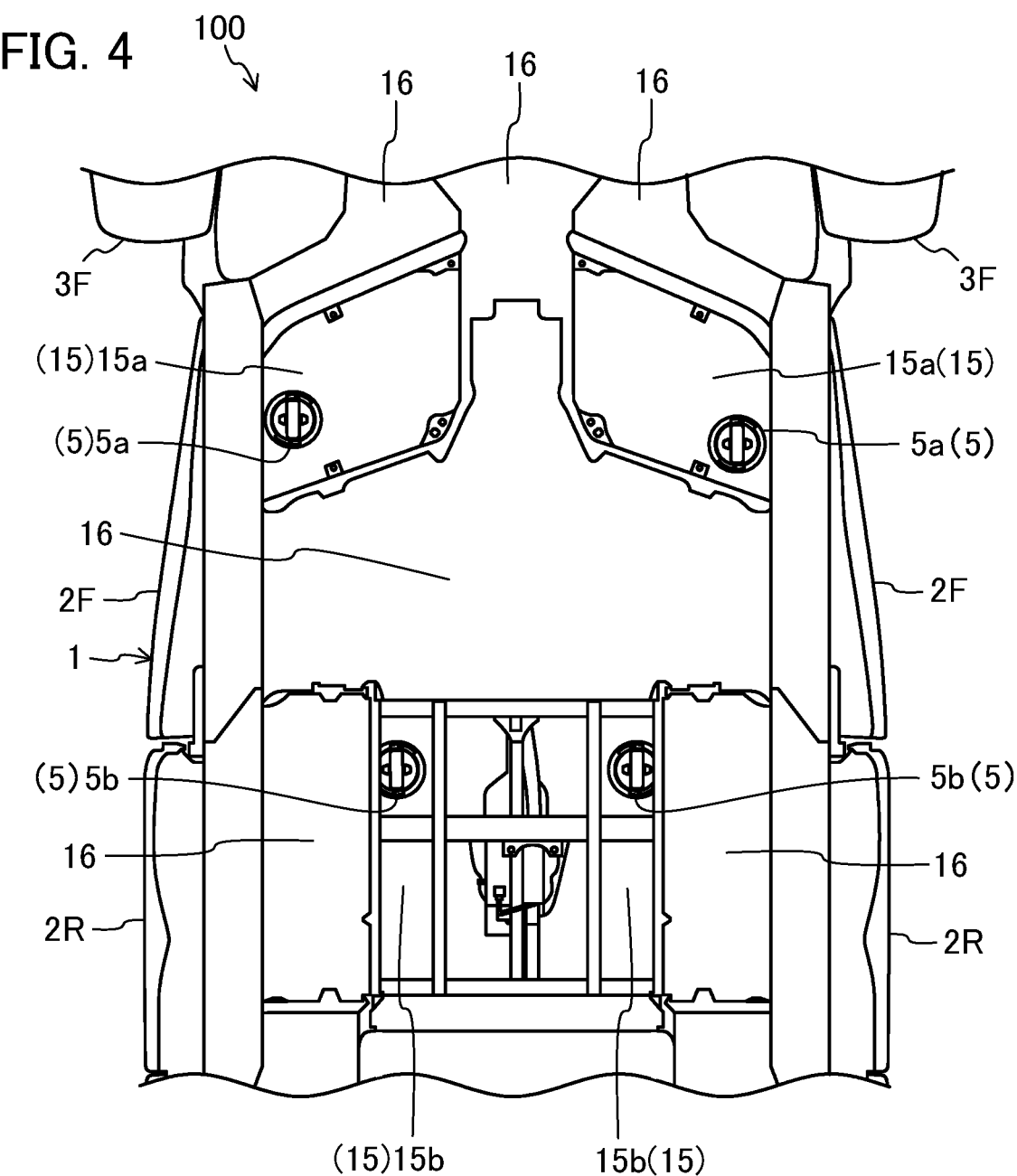
FIG. 4 is a bottom view showing a state in which second protection panels are detached from the state of FIG. 3.

FIG. 2 is a plan view showing the inside of the cabin 12 from above. FIG. 3 is a bottom view showing the vehicle body 1 from below. FIG. 4 is a bottom view showing a state in which second protection panels 17 are detached from the state of FIG. 3.

The utility vehicle 100 further includes floor drains 5 disposed at a floor panel 15 of the vehicle body 1. The floor drain 5 is for discharging muddy water, gravels, etc. having entered the cabin 12 to the outside of the vehicle.

As shown in FIG. 2, the floor panel 15 defines a bottom portion of the cabin 12. Although not shown in the figure, the floor panel 15 is attached to, e.g., a main frame of the vehicle body frame 11. The floor panel 15 is one example of a floor. Specifically, the floor panel 15 includes front floor panels 15a on a front seat 4F side and rear floor panels 15b on a rear seat 4R side. The front floor panel 15a is one example of a front floor, and the rear floor panel 15b is one example of a rear floor.

In this example, there are the floor drains 5. The floor drains 5 are each disposed at the front floor panels 15a and the rear floor panels 15b. Specifically, the floor drains 5 are, one by one, disposed at the right and left front floor panels 15a. Moreover, the floor drains 5 are, one by one, disposed at the right and left rear floor panels 15b. Note that in a case where the floor drains 5 are distinguished from each other in description, the floor drain 5 disposed at the front floor panel 15a will be referred to as a front floor drain 5a and the floor drain 5 disposed at the rear floor panel 15b will be referred to as a rear floor drain 5b.

Specifically, the front floor drain 5a is arranged on the outer side in the vehicle width direction at each of the right and left front floor panels 15a. The rear floor drain 5b is arranged on the center side in the vehicle width direction at each of the right and left rear floor panels 15b. More specifically, the rear floor drain 5b is disposed at a position closer to the front seat 4F than the rear seat 4R is to the front seat 4F in the front-rear direction of the rear floor panel 15b. Since each floor drain 5 is disposed at such a position, the floor drains 5 are arranged at such positions that the occupant does not step on the floor drain 5 as much as possible. Thus, action of the force of gravity of the occupant on the floor drain 5 can be reduced.

At the floor panel 15, the floor drain 5 on one of a driver seat side or a passenger seat side is, for avoiding a fuel tank, arranged on the front side with respect to the floor drain 5 on the other one of the driver seat side or the passenger seat side. Specifically, at the front floor panel 15a of this example, the right front floor drain 5a, i.e., the front floor drain 5a on the passenger side, is arranged on the front side with respect to the left front floor drain 5a, i.e., the front floor drain 5a on the driver seat side, for avoiding the fuel tank disposed below the front floor panel 15a. Since the right and left front floor drains 5a are arranged as described above, muddy water etc. having entered the cabin 12 can be discharged to the outside of the vehicle without interference by the fuel tank. Note that the front floor drain 5a on the driver seat side, i.e., the left side, may be arranged on the front side with respect to the front floor drain 5a on the passenger seat side, i.e., the right side, for avoiding the fuel tank. The fuel tank is not necessarily disposed below the front floor panel 15a, and may be disposed below the front seat 4F, i.e., a driver seat or a passenger seat.

As shown in FIG. 3, the vehicle body 1 has first protection panels 16 and the second protection panels 17 disposed below the floor panel 15 and attached to, e.g., the main frame of the vehicle body frame 11. The first protection panels 16 and the second protection panels 17 protect the floor panel 15.

The first protection panel 16 is undetachably fixed to the vehicle body frame 11 by, e.g., welding. The second protection panel 17 is detachably attached to the vehicle body frame 11 with, e.g., a bolt. Specifically, there are the second protection panels 17 in regions corresponding to the floor drains 5. Specifically, the second protection panels 17 include two front protection panels 17a disposed in regions corresponding to the front floor drains 5a and one rear protection panel 17b disposed in a region corresponding to the rear floor drains 5b.

As shown in FIG. 4, the floor drains 5 are exposed below the vehicle body 1 by detachment of the second protection panels 17. That is, two front floor drains 5a are exposed by detachment of two front protection panels 17a. Two rear floor drains 5b are exposed by detachment of one rear protection panel 17b. Thus, muddy water etc. in the cabin 12 are discharged to the outside of the vehicle through the floor drains 5.

Figure 5:
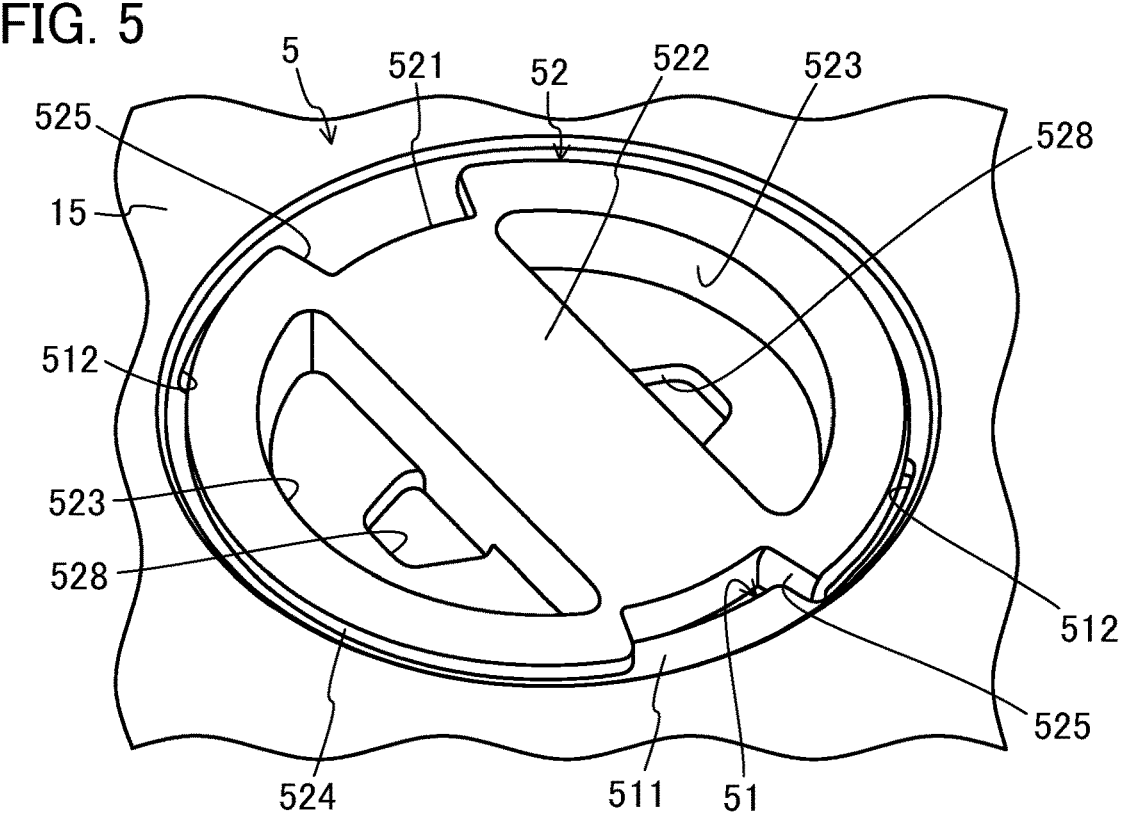
FIG. 5 is a perspective view showing a floor drain diagonally from above.
Figure 6:
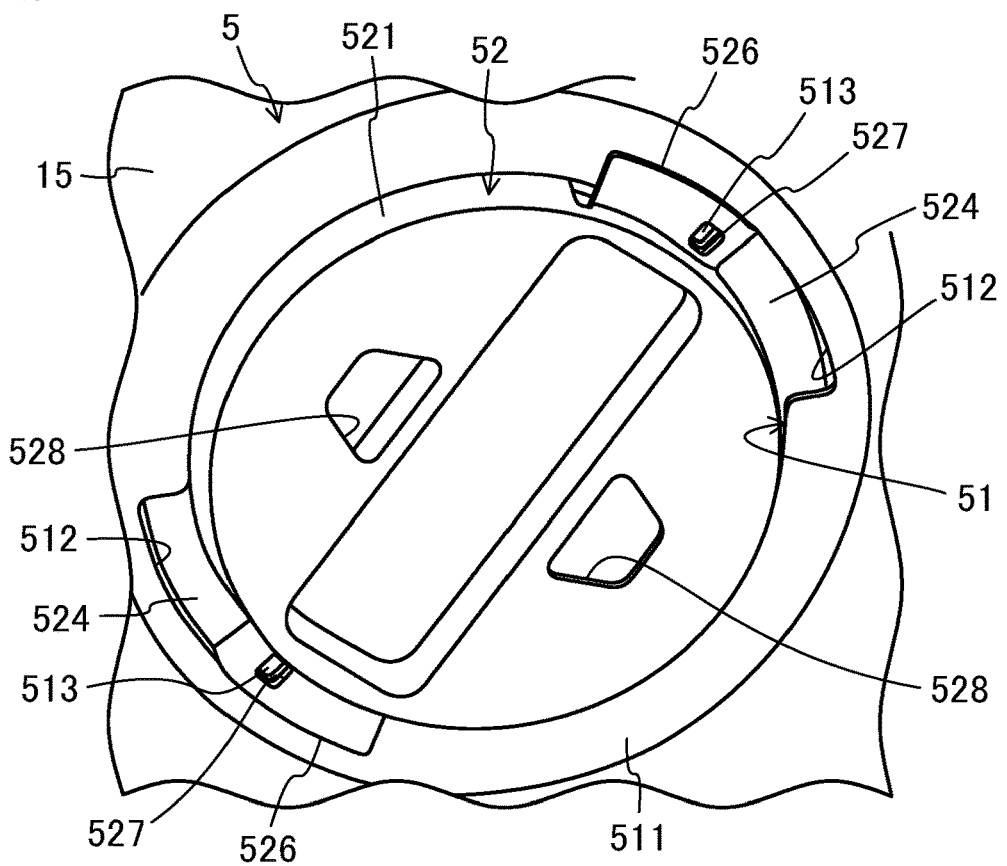
FIG. 6 is a perspective view showing the floor drain diagonally from below.
Figure 7:
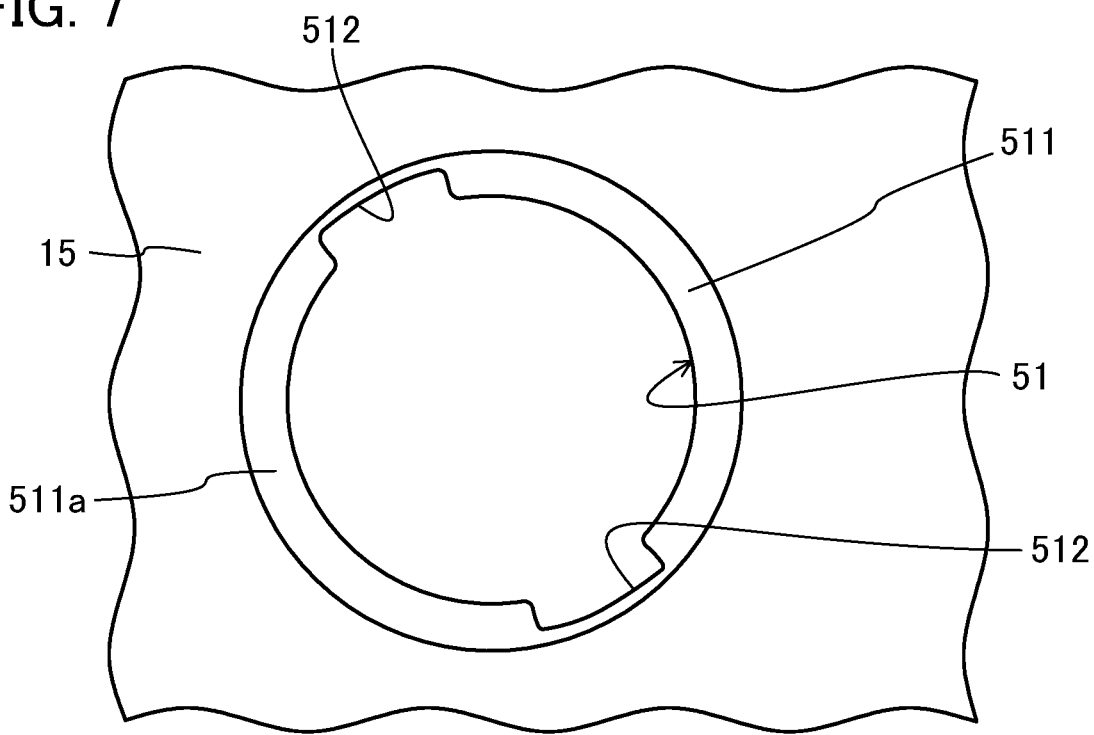
FIG. 7 is a plan view showing a drain opening from above.
Figure 8:
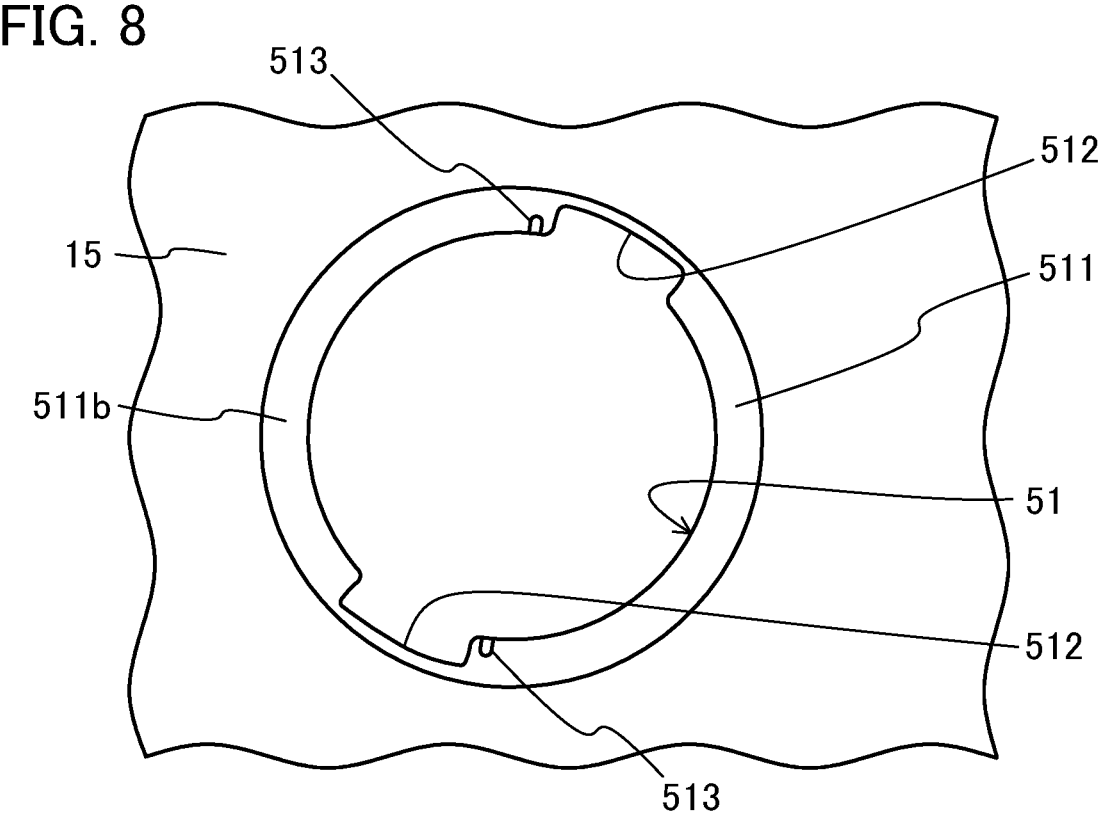
FIG. 8 is a bottom view showing the drain opening from below.

FIG. 5 is a perspective view showing the floor drain 5 diagonally from above. FIG. 6 is a perspective view showing the floor drain 5 diagonally from below. FIG. 7 is a plan view showing a drain opening 51 from above. FIG. 8 is a bottom view showing the drain opening 51 from below.

The floor drain 5 includes the drain opening 51 located at the floor panel 15 and a cap 52 that opens or closes the drain opening 51.

The drain opening 51 is an opening for discharging muddy water etc. The drain opening 51 is a circular opening penetrating the floor panel 15 in the up-down direction. In this example, a peripheral edge 511 of the drain opening 51 is recessed from a floor surface, i.e., an upper surface of the floor panel 15. That is, an upper surface 511a of the peripheral edge 511 is positioned lower than the upper surface of the floor panel 15.

The peripheral edge 511 of the drain opening 51 includes grooves 512 extending in the up-down direction. In this example, there are the grooves 512, more specifically two grooves 512. Two grooves 512 are located at positions shifted from each other by 180 degrees in a circumferential direction of the peripheral edge 511. That is, two grooves 512 face each other.

Figure 9:
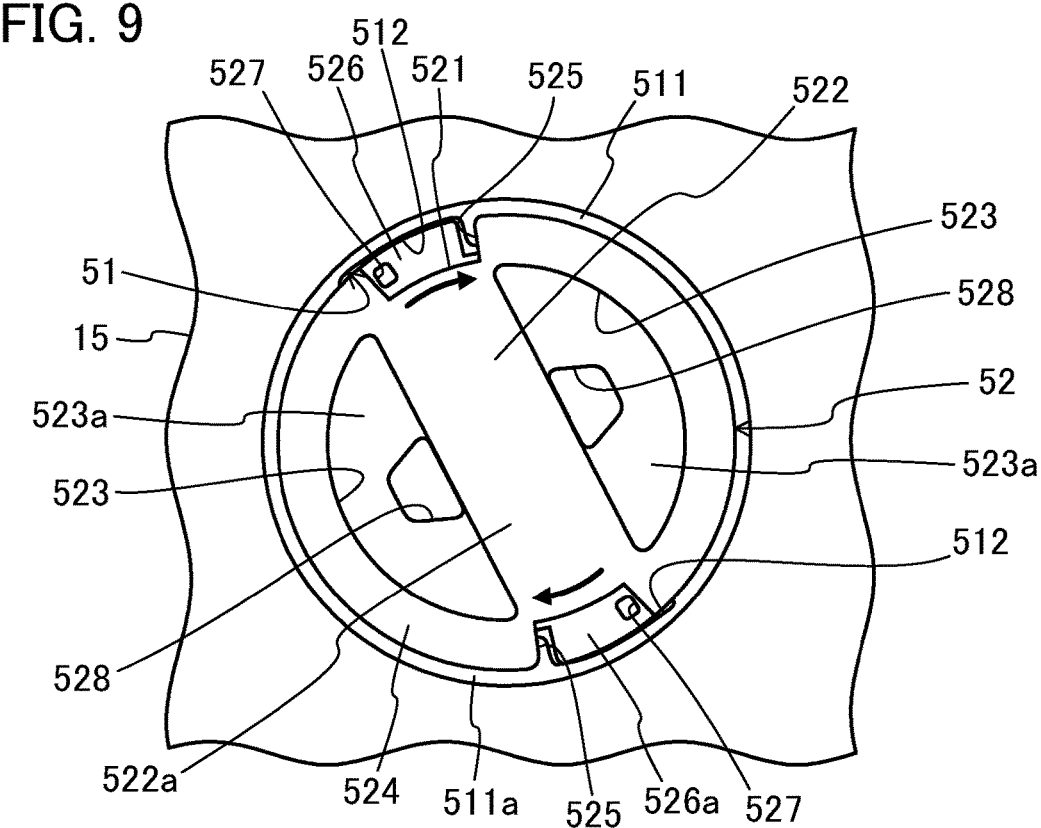
FIG. 9 is a plan view showing, from above, the floor drain when a cap is at an open position.
Figure 10:
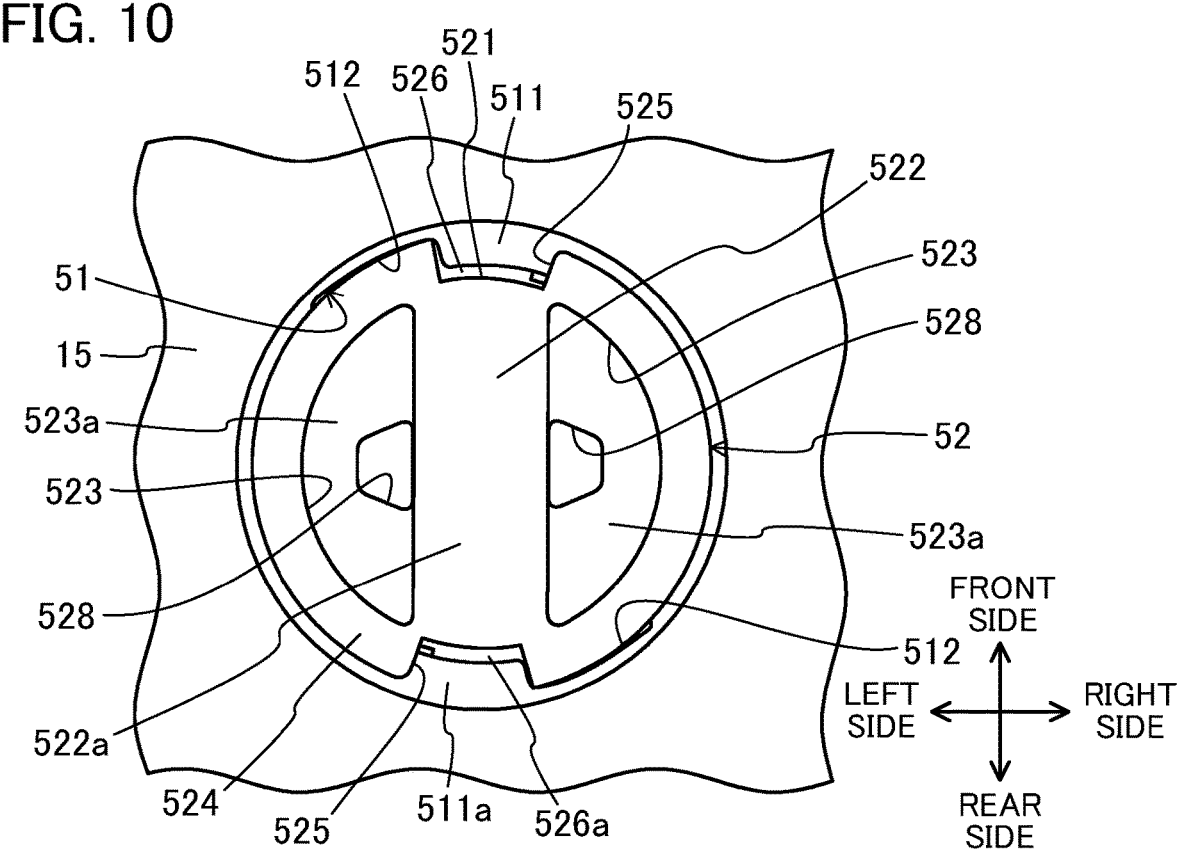
FIG. 10 is a plan view showing, from above, the floor drain when the cap is at a closed position.
Figure 11:
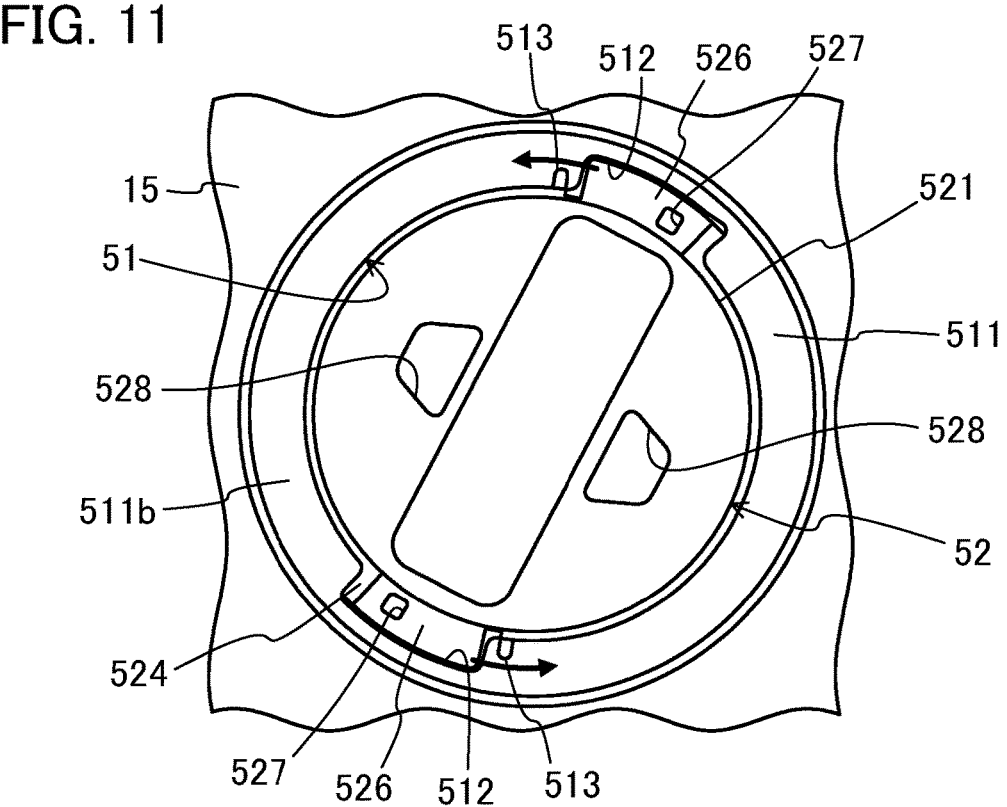
FIG. 11 is a bottom view showing, from below, the floor drain when the cap is at the open position.
Figure 12:
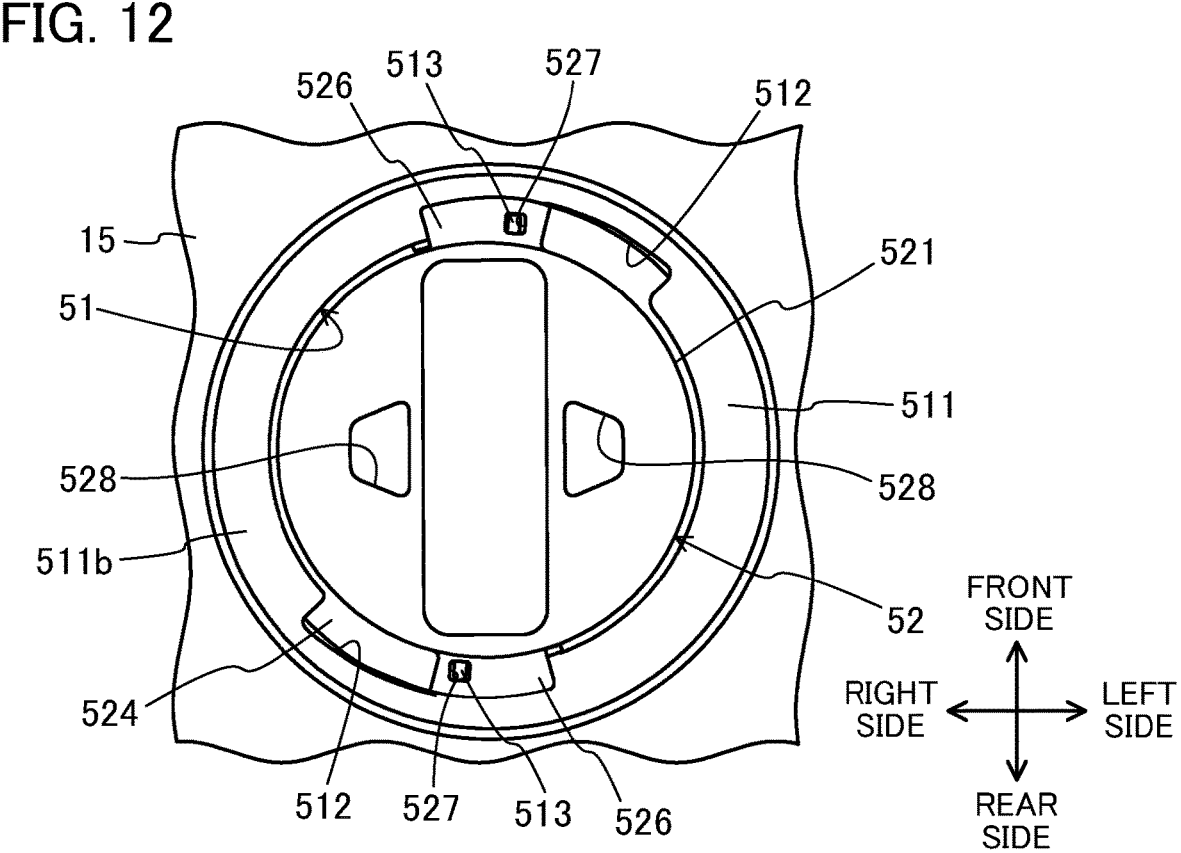
FIG. 12 is a bottom view showing, from below, the floor drain when the cap is at the closed position.
Figure 13:
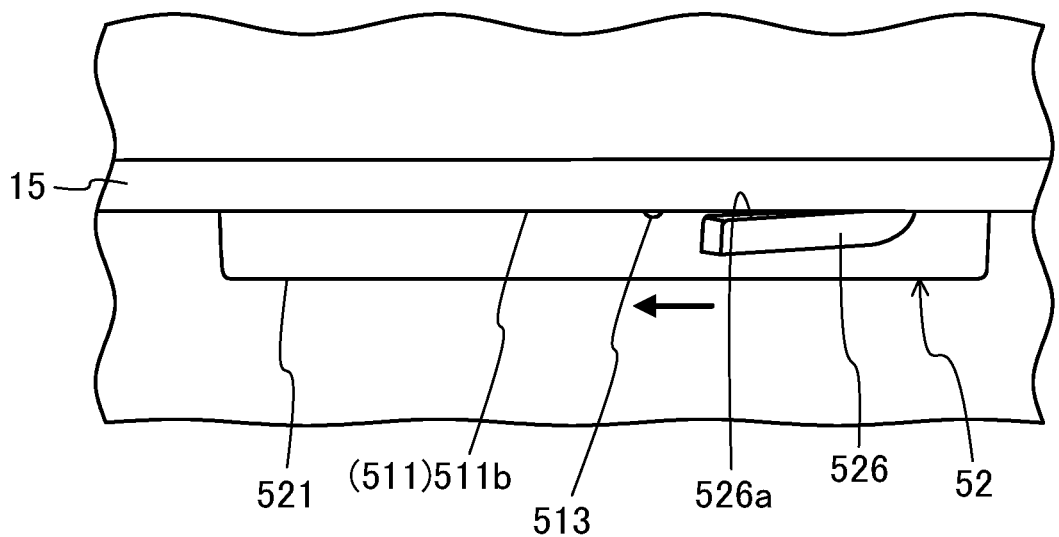
FIG. 13 is a side view showing, from the side, the floor drain when the cap is at the open position.
Figure 14:
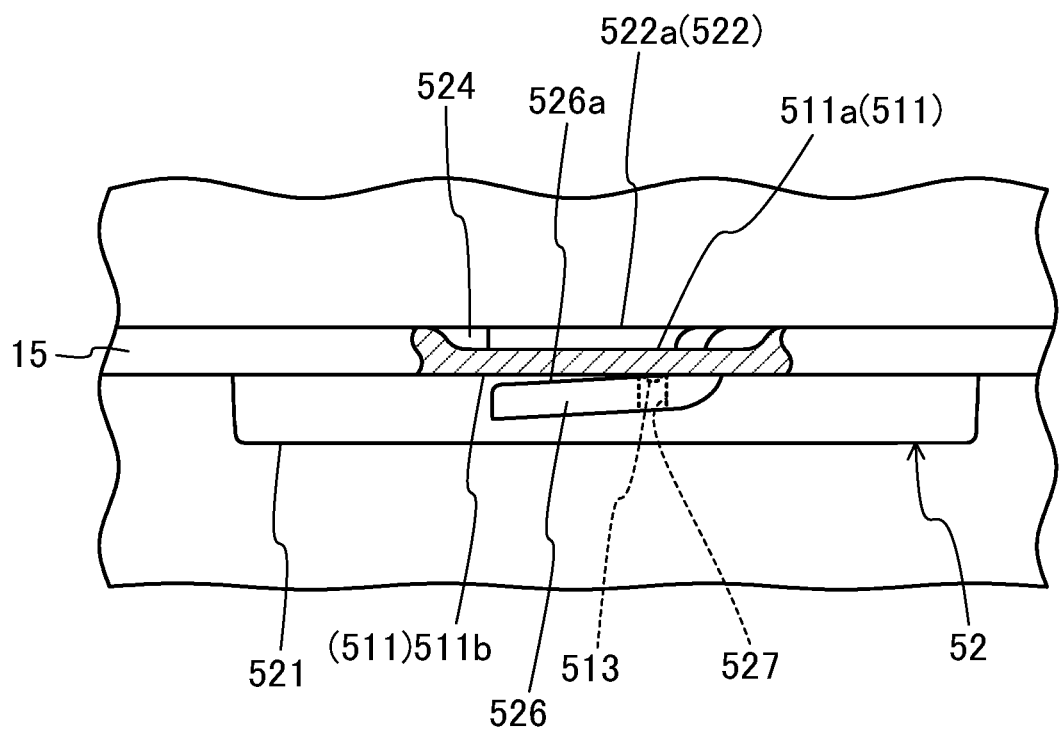
FIG. 14 is a partial sectional view showing, from the side, the floor drain when the cap is at the closed position.

FIG. 9 is a plan view showing, from above, the floor drain 5 when the cap 52 is at an open position. FIG. 10 is a plan view showing, from above, the floor drain 5 when the cap 52 is at a closed position. FIG. 11 is a bottom view showing, from below, the floor drain 5 when the cap 52 is at the open position. FIG. 12 is a bottom view showing, from below, the floor drain 5 when the cap 52 is at the closed position. FIG. 13 is a side view showing, from the side, the floor drain 5 when the cap 52 is at the open position. FIG. 14 is a partial sectional view showing, from the side, the floor drain 5 when the cap 52 is at the closed position. Hereinafter, the cap 52 at the closed position means a state in which the cap 52 engages with the drain opening 51 to close the drain opening 51. Moreover, the cap 52 at the open state means a state in which the cap 52 and the drain opening 51 disengage from each other and the cap 52 is detachable from the drain opening 51.

The cap 52 is attached to or detached from the drain opening 51, thereby closing or opening the drain opening 51. Specifically, the cap 52 has a body 521, a knob 522, a flange 524, and claws 526.

The body 521 is in a circular columnar shape extending in the up-down direction. The outer diameter of the body 521 is slightly smaller than the diameter of the drain opening 51. The knob 522 is a portion to be gripped with a hand of the occupant when the cap 52 is attached to or detached from the drain opening 51. The knob 522 is disposed at the body 521. Specifically, at an upper surface of the body 521, two recesses 523 are located with a space kept therebetween. A portion between these two recesses 523 is the knob 522. The knob 522 has a shape extending in the horizontal direction. An upper surface 522a of the knob 522 is equivalent to the upper surface of the body 521.

The flange 524 is disposed at an outer peripheral surface of the body 521. The flange 524 is a portion to be mounted on the upper surface 511a of the peripheral edge 511 of the drain opening 51. The flange 524 is in a circular shape, and has an outer diameter greater than the diameter of the drain opening 51. The flange 524 includes two cutouts 525 at positions shifted from each other by 180 degrees. These two cutouts 525 divide the flange 524 in two portions in the circumferential direction.

The claws 526 are disposed at positions lower than the flange 524 at the outer peripheral surface of the body 521. In this example, there are the claws 526, more specifically two claws 526. Two claws 526 are disposed at positions shifted from each other by 180 degrees at the outer peripheral surface of the body 521. More specifically, two claws 526 are each disposed at positions corresponding to the cutouts 525 at the outer peripheral surface of the body 521. The claw 526 protrudes outward in a radial direction of the body 521 from the outer peripheral surface thereof.

The cap 52 configured as described above closes the drain opening in such a manner that upper surfaces 526a of the claws 526 contact a lower surface 511b of the peripheral edge 511 by rotation of the body 521 in a predetermined rotation direction with the claws 526 inserted downward into the grooves 512.

That is, in order to attach the cap 52 to the drain opening 51 to close the drain opening 51, the claws 526 are inserted downward into the grooves 512 of the peripheral edge 511 as shown in FIGS. 9 and 11. More specifically, the claws 526 are inserted into the grooves 512 until the flange 524 contacts the upper surface 511a of the peripheral edge 511.

In this state, the claws 526 are positioned lower than the peripheral edge 511 as shown in FIG. 13. Then, the body 521 is rotated in the predetermined rotation direction as indicated by arrows in FIGS. 9, 11, and 13. Accordingly, the upper surfaces 526a of the claws 526 contact the lower surface 511b of the peripheral edge 511 as shown in FIG. 14, and the drain opening 51 is closed accordingly.

As shown in FIGS. 13 and 14, the upper surface 526a of the claw 526 is inclined upward in the opposite direction of the predetermined rotation direction. That is, the upper surface 526a of the claw 526 is not a horizontal surface, but is an inclined surface. Thus, when the body 521 is rotated in the predetermined rotation direction, the upper surface 526a of the claw 526 gradually approaches and contacts the lower surface 511b of the peripheral edge 511. This can prevent interference with rotation due to contact of the claw 526 with the peripheral edge 511 when the body 521 is rotated in the predetermined rotation direction. Thus, rotary motion of the body 521 can be smooth, and as a result, the drain opening 51 can be easily opened or closed. Note that in this example, the opposite direction of the predetermined rotation direction may also be referred to as one side in the circumferential direction of the body 521 and the predetermined rotation direction may also be referred to as the other side in the circumferential direction of the body 521.

A protrusion 513 is disposed at one of the peripheral edge 511 or the claw 526, and a hole 527 in which the protrusion 513 is locked after the body 521 has been rotated in the predetermined rotation direction is located at the other one of the peripheral edge 511 or the claw 526. In this example, the protrusion 513 is disposed at the lower surface 511b of the peripheral edge 511, and the hole 527 is located at the claw 526. The hole 527 is one example of a lock. According to this configuration, when the protrusion 513 is fitted in the hole 527 as shown in FIG. 14, the upper surface 526a of the claw 526 contacts the lower surface 511b of the peripheral edge 511. The protrusion 513 is fitted in the hole 527 of the claw 526 so that position shift of the cap 52 in the circumferential direction can be prevented, and therefore, the cap 52 is easily maintained at the closed position. Thus, the drain opening 51 can be easily opened or closed.

In a state in which the cap 52 closes the drain opening 51 as shown in FIG. 14, the position of the upper surface 522a of the knob 522 and the position of the upper surface of the floor panel 15 are coincident with each other in the up-down direction. That is, the upper surface 522a of the knob 522 and the upper surface of the floor panel 15 are flush with each other. Thus, a situation where a foot of the occupant is caught by the knob 522 can be reduced as compared to, e.g., a case where the upper surface of the knob is higher than the upper surface of the floor panel 15.

In a state in which the cap 52 closes the drain opening 51 as shown in FIG. 10, the knob 522 has a shape extending in the front-rear direction. That is, when the knob 522 is at the closed position, the knob 522 extends in the front-rear direction. Thus, the situation where the foot of the occupant is caught by the knob 522 can be reduced, as described above, as compared to, e.g., a case where the knob extends in the vehicle width direction.

As shown in FIGS. 10 and 12, the cap 52 includes communication holes 528 causing a space above the cap 52, i.e., the cabin 12, and the drain opening 51 to communicate with each other. In this example, there are the communication holes 528, specifically two communication holes 528. According to this configuration, muddy water etc. in the cabin 12 are discharged to the outside of the vehicle through the communication holes 528 in a state in which the cap 52 closes the drain opening 51. This can prevent clogging of the cap 52 due to quick accumulation of muddy water etc. in the cabin 12.

Figure 15:
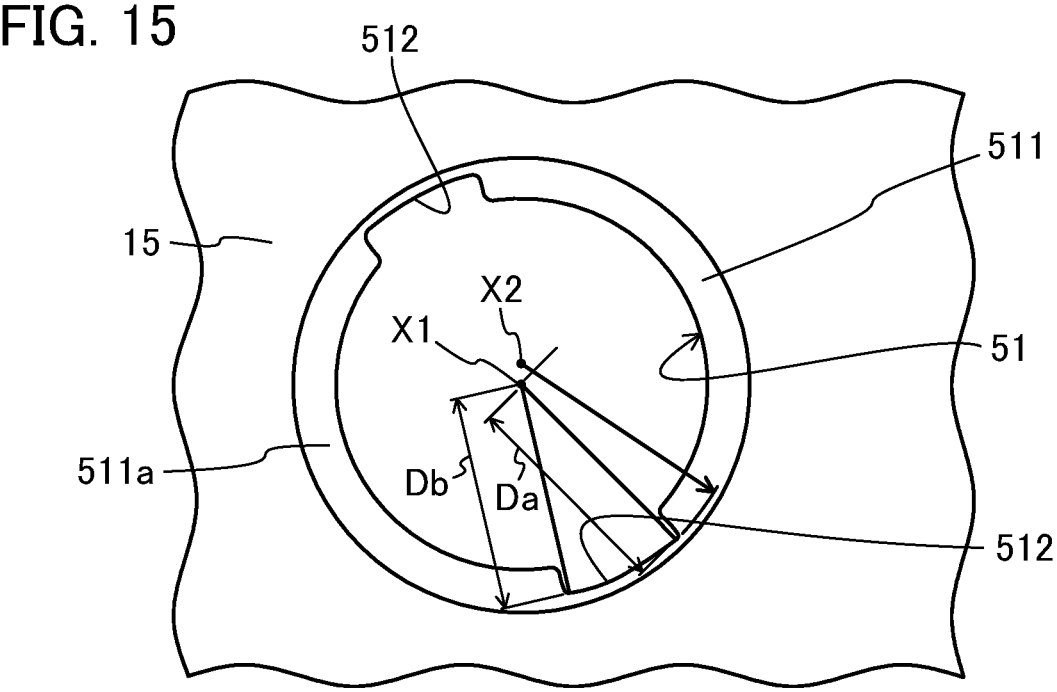
FIG. 15 is a plan view for describing a relationship between the rotation axis of the cap and the center of an arc of a groove.
Figure 16:
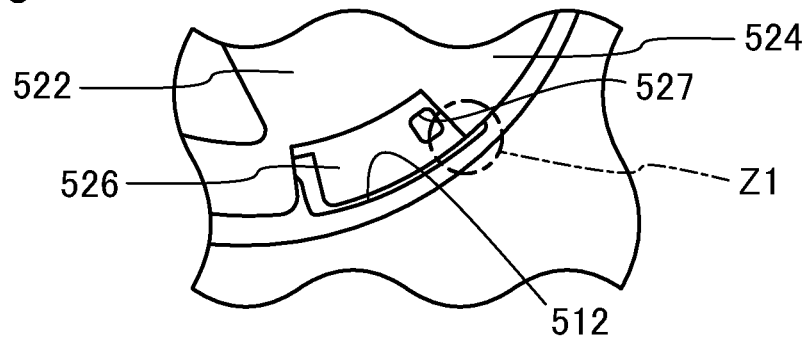
FIG. 16 is an enlarged plan view showing a main portion of the floor drain when the cap is at the open position.
Figure 17:
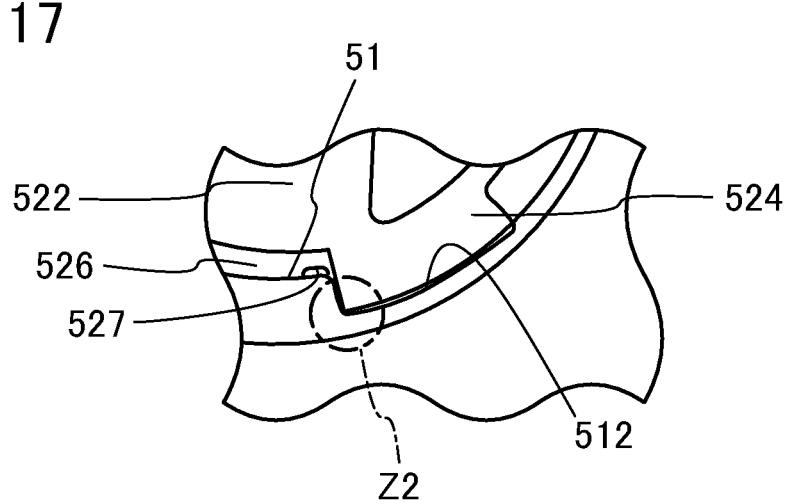
FIG. 17 is an enlarged plan view showing the main portion of the floor drain when the cap is at the closed position.

FIG. 15 is a plan view for describing a relationship between the rotation axis X1 of the cap 52 and the center axis X2 of an arc of the groove 512. FIG. 16 is an enlarged plan view showing a main portion of the floor drain 5 when the cap 52 is at the open position. FIG. 17 is an enlarged plan view showing the main portion of the floor drain 5 when the cap 52 is at the closed position.

As shown in FIG. 15, the center axis X2 that is the center of an arc of the bottom of the groove 512 is, in the drain opening 51, eccentric with respect to the rotation axis X1 of the cap 52. That is, the rotation axis X1 and the center axis X2 are eccentric with respect to each other such that a distance Db between the rotation axis X1 and a closing-side end portion of the bottom of the groove 512, i.e., the left end portion in FIG. 15, is shorter than a distance Da between the rotation axis X1 and an opening-side end portion of the bottom of the groove 512, i.e., the right end portion in FIG. 15. With this configuration, a clearance between the flange 524 and the opening-side end portion of the bottom of the groove 512 is relatively large when the cap 52 is at the open position, as indicated by Z1 in FIG. 16. A clearance between the flange 524 and the closing-side end portion of the bottom of the groove 512 is relatively small when the cap 52 is at the closed position, as indicated by Z2 in FIG. 17. Thus, when the cap 52 is rotated in the predetermined rotation direction, torque necessary for rotating the cap 52 can be small at an initial stage. Consequently, the drain opening 51 can also be easily opened or closed.

As described above, the floor drain 5 for the utility vehicle 100 includes the drain opening 51 located at the floor panel 15 and the cap 52 that opens or closes the drain opening 51. The grooves 512 extending in the up-down direction are provided at the peripheral edge 511 of the drain opening 51. The cap 52 has the circular columnar body 521 extending in the up-down direction, the flange 524 disposed at the outer peripheral surface of the body 521 and mounted on the peripheral edge 511, and the claws 526 disposed at the positions lower than the flange 524 at the outer peripheral surface of the body 521, and the drain opening 51 is closed in such a manner that the upper surfaces 526a of the claws 526 contact the lower surface 511b of the peripheral edge 511 by rotation of the body 521 in the predetermined rotation direction with the claws 526 inserted downward into the grooves 512. The upper surface 526a of the claw 526 is inclined upward in the opposite direction of the predetermined rotation direction.

The utility vehicle 100 includes the vehicle body 1 having the floor panel 15 and the above-described floor drains 5 disposed at the floor panel 15.

According to these configurations, since the upper surface 526a of the claw 526 is inclined upward in the opposite direction of the predetermined rotation direction, the upper surface 526a of the claw 526 gradually approaches and contacts the lower surface 511b of the peripheral edge 511 when the body 521 is rotated in the predetermined rotation direction. This can prevent interference with rotation due to contact of the claw 526 with the peripheral edge 511 when the body 521 is rotated in the predetermined rotation direction. Thus, rotary motion of the body 521 can be smooth, and as a result, the drain opening 51 can be easily opened or closed as compared to, e.g., a form in which the cap is attached to the drain opening by screwing.

The protrusion 513 is disposed at the lower surface 511b of the peripheral edge 511, and the hole 527 in which the protrusion 513 is fitted after the body 521 has been rotated in the predetermined rotation direction is located at the claw 526.

According to this configuration, when the protrusion 513 is fitted in the hole 527, the upper surface 526a of the claw 526 contacts the lower surface 511b of the peripheral edge 511. The protrusion 513 is fitted in the hole 527 of the claw 526 so that position shift of the cap 52 in the circumferential direction can be prevented. Thus, the cap 52 can be easily maintained at the closed position. Consequently, the drain opening 51 can be easily opened or closed.

The cap 52 has the knob 522 disposed at the body 521. In a state in which the cap 52 closes the drain opening 51, the position of the upper surface 522a of the knob 522 and the position of the upper surface of the floor panel 15 are coincident with each other in the up-down direction.

According to this configuration, the situation where the foot of the occupant is caught by the knob 522 can be reduced as compared to, e.g., the case where the upper surface of the knob is higher than the upper surface of the floor panel 15.

In the state in which the cap 52 closes the drain opening 51, the knob 522 has the shape extending in the front-rear direction of the utility vehicle 100.

According to this configuration, the situation where the foot of the occupant is caught by the knob 522 can be reduced as compared to, e.g., the case where the knob extends in the vehicle width direction.

The cap 52 includes the communication holes 528 causing the space above the cap 52 and the drain opening 51 to communicate with each other.

According to this configuration, muddy water etc. in the cabin 12 are discharged to the outside of the vehicle through the communication holes 528 in a state in which the cap 52 closes the drain opening 51. This can prevent clogging of the cap 52 due to quick accumulation of muddy water etc. in the cabin 12.

The floor panel 15 includes the front floor panels 15a on the front seat 4F side and the rear floor panels 15b on the rear seat 4R side. At the rear floor panel 15b, the floor drain 5 is disposed on the center side in the vehicle width direction of the vehicle body 1.

According to this configuration, since each floor drain 5 is disposed at such a position, the floor drains 5 are arranged at such positions that the occupant does not step on the floor drain 5 as much as possible. Thus, action of the force of gravity of the occupant on the floor drain 5 can be reduced.

At the front floor panels 15a, the floor drain 5 on one of the driver seat side or the passenger seat side is disposed on the front side with respect to the floor drain 5 on the other one of the driver seat side or the passenger seat side for avoiding the fuel tank.

According to this configuration, muddy water etc. in the cabin 12 can be discharged to the outside of the vehicle without interference by the fuel tank.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the number of grooves 512 and the number of claws 526 are not limited to the above-described numbers, and may be one or three or more.

In the case of a low probability of the occupant being tripped, the knob 522 of the cap 52 may protrude from the upper surface of the floor panel 15.

The communication hole 528 may be omitted.

The protrusion 513 and the hole 527 of the claw 526 may be omitted.

The hole 527 may be located at the peripheral edge 511, and the protrusion 513 may be disposed at the upper surface 526a of the claw 526. That is, the lock may be located at the peripheral edge 511.

The lock is not limited to the hole 527, i.e., a through-hole, and may be a groove or a bottomed hole, for example.

The upper surface 526a of the claw 526 is not limited to the inclined surface, and may be a horizontal surface, for example.

Arrangement of the floor drains 5 at the floor panel 15 is not limited to that described above, and the floor drain 5 may be arranged at any position as long as muddy water etc. can be discharged to the outside of the vehicle.

What is claimed:

1. A utility vehicle, comprising:
a drain opening located at a floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body and having an upper surface inclined upward toward one side in a circumferential direction of the body,
the upper surface of the claw and a lower surface of the peripheral edge contact each other to close the drain opening in such a manner that the body is rotated to the other side in the circumferential direction of the body with the claw inserted downward into the groove,
the cap has a knob disposed at the body and the cap has a recess that is recessed downward from the knob,
in a state in which the cap closes the drain opening, a position of an upper surface of the knob and a position of an upper surface of the floor are coincident with each other in the up-down direction, and
in the state in which the cap closes the drain opening, the knob has a shape extending in a front-rear direction of the utility vehicle and the recess is located on a side of the knob extending in the front-rear direction.

2. A utility vehicle, comprising:
a drain opening located at a floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body, and the drain opening is closed in such a manner that an upper surface of the claw contacts a lower surface of the peripheral edge by rotation of the body in a predetermined rotation direction with the claw inserted downward into the groove, and
a protrusion is disposed at one of the peripheral edge or the claw, and a lock that locks the protrusion after the body has been rotated in the predetermined rotation direction is located at the other one of the peripheral edge or the claw,
the cap has a knob disposed at the body and the cap has a recess that is recessed downward from the knob,
in a state in which the cap closes the drain opening, a position of an upper surface of the knob and a position of an upper surface of the floor are coincident with each other in the up-down direction, and
in the state in which the cap closes the drain opening, the knob has a shape extending in a front-rear direction of the utility vehicle and the recess is located on a side of the knob extending in the front-rear direction.

3. The utility vehicle according to claim 1, wherein a protrusion is disposed at one of the peripheral edge or the claw, and a lock that locks the protrusion after the body has been rotated to the other side is located at the other one of the peripheral edge or the claw.

4. A floor drain for a utility vehicle, comprising:
a drain opening located at a floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body and having an upper surface inclined upward toward one side in a circumferential direction of the body, and
the upper surface of the claw and a lower surface of the peripheral edge contact each other to close the drain opening in such a manner that the body is rotated to the other side in the circumferential direction of the body with the claw inserted downward into the groove, wherein
the cap includes a communication hole causing a space above the cap and the drain opening to communicate with each other.

5. A utility vehicle comprising:
a vehicle body having a floor; and
a floor drain for a utility vehicle, including:
a drain opening located at the floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body and having an upper surface inclined upward toward one side in a circumferential direction of the body, and
the upper surface of the claw and a lower surface of the peripheral edge contact each other to close the drain opening in such a manner that the body is rotated to the other side in the circumferential direction of the body with the claw inserted downward into the groove,
wherein the floor drain is disposed at the floor,
the floor includes a front floor on a front seat side and a rear floor on a rear seat side, and
at the rear floor, the floor drain is disposed on a center side in a vehicle width direction of the vehicle body.

6. A utility vehicle comprising:
a vehicle body having a floor; and
a floor drain for a utility vehicle, including:
a drain opening located at the floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body and having an upper surface inclined upward toward one side in a circumferential direction of the body, and
the upper surface of the claw and a lower surface of the peripheral edge contact each other to close the drain opening in such a manner that the body is rotated to the other side in the circumferential direction of the body with the claw inserted downward into the groove,
wherein the floor drain is disposed at the floor, and
at the floor, the floor drain on one of a driver seat side or a passenger seat side is disposed on a front side with respect to the floor drain on the other one of the driver seat side or the passenger seat side for avoiding a fuel tank.

7. A floor drain for a utility vehicle, comprising:
a drain opening located at a floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body and having an upper surface inclined upward toward one side in a circumferential direction of the body,
the upper surface of the claw and a lower surface of the peripheral edge contact each other to close the drain opening in such a manner that the body is rotated to the other side in the circumferential direction of the body with the claw inserted downward into the groove,
wherein a center axis of the groove and a rotation axis of the cap are eccentric with respect to each other.

8. A floor drain for a utility vehicle, comprising:
a drain opening located at a floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body, and the drain opening is closed in such a manner that an upper surface of the claw contacts a lower surface of the peripheral edge by rotation of the body in a predetermined rotation direction with the claw inserted downward into the groove, and
a protrusion is disposed at one of the peripheral edge or the claw, and a lock that locks the protrusion after the body has been rotated in the predetermined rotation direction is located at the other one of the peripheral edge or the claw,
wherein a center axis of the groove and a rotation axis of the cap are eccentric with respect to each other.

9. A floor drain for a utility vehicle, comprising:
a drain opening located at a floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body, and the drain opening is closed in such a manner that an upper surface of the claw contacts a lower surface of the peripheral edge by rotation of the body in a predetermined rotation direction with the claw inserted downward into the groove, and
a protrusion is disposed at one of the peripheral edge or the claw, and a lock that locks the protrusion after the body has been rotated in the predetermined rotation direction is located at the other one of the peripheral edge or the claw,
wherein the cap includes a communication hole causing a space above the cap and the drain opening to communicate with each other.

10. A utility vehicle comprising:
a vehicle body having a floor; and
a floor drain for a utility vehicle, comprising:
a drain opening located at the floor of the utility vehicle; and
a cap that opens or closes the drain opening,
wherein a groove extending in an up-down direction is located at a peripheral edge of the drain opening,
the cap has a circular columnar body extending in the up-down direction, a flange disposed at an outer peripheral surface of the body and mounted on the peripheral edge, and a claw disposed at a position lower than the flange at the outer peripheral surface of the body, and the drain opening is closed in such a manner that an upper surface of the claw contacts a lower surface of the peripheral edge by rotation of the body in a predetermined rotation direction with the claw inserted downward into the groove, and
a protrusion is disposed at one of the peripheral edge or the claw, and a lock that locks the protrusion after the body has been rotated in the predetermined rotation direction is located at the other one of the peripheral edge or the claw,
wherein the floor drain is disposed at the floor, the floor includes a front floor on a front seat side and a rear floor on a rear seat side, and
at the rear floor, the floor drain is disposed on a center side in a vehicle width direction of the vehicle body.

11. A utility vehicle comprising:
a vehicle body having a floor; and
a floor drain for a utility vehicle, comprising:
a drain opening located at the floor of the utility vehicle; and
a cap that opens or closes the drain opening, wherein a groove extending in an up-down direction is located at a peripheral edge of the drain opening, the cap has a circular columnar body extending in the up-down direction, a flange disposed at an outer peripheral surface of the body and mounted on the peripheral edge, and a claw disposed at a position lower than the flange at the outer peripheral surface of the body, and the drain opening is closed in such a manner that an upper surface of the claw contacts a lower surface of the peripheral edge by rotation of the body in a predetermined rotation direction with the claw inserted downward into the groove, and a protrusion is disposed at one of the peripheral edge or the claw, and a lock that locks the protrusion after the body has been rotated in the predetermined rotation direction is located at the other one of the peripheral edge or the claw, wherein the floor drain is disposed at the floor, wherein at the floor, the floor drain on one of a driver seat side or a passenger seat side is disposed on a front side with respect to the floor drain on the other one of the driver seat side or the passenger seat side for avoiding a fuel tank.

\* \* \* \* \*